(12) United States Patent
Ekkert

(10) Patent No.: US 7,399,425 B2
(45) Date of Patent: Jul. 15, 2008

(54) CLOSURE WITH OXYGEN SCAVENGER

(75) Inventor: Len Ekkert, Lemont, IL (US)

(73) Assignee: Phoenix Closures, Inc., Naperville, IL (US)

( * ) Notice: Subject to any disclaimer, the term of this patent is extended or adjusted under 35 U.S.C. 154(b) by 607 days.

(21) Appl. No.: 10/991,183

(22) Filed: Nov. 17, 2004

(65) Prior Publication Data

US 2006/0102875 A1    May 18, 2006

(51) Int. Cl.
    *B01D 19/00* (2006.01)
(52) U.S. Cl. .............................. 252/188.21; 252/188.28
(58) Field of Classification Search ............ 252/188.28; 215/200, 270
    See application file for complete search history.

(56) References Cited

U.S. PATENT DOCUMENTS

| | | | |
|---|---|---|---|
| 2,825,651 A * | 3/1958 | Loo et al. .................... 426/541 |
| 3,586,514 A | 6/1971 | Vijlbrief |
| 4,143,785 A * | 3/1979 | Ferrell ......................... 215/270 |
| 4,461,392 A * | 7/1984 | Conti .......................... 215/270 |
| 5,750,037 A * | 5/1998 | Bizot et al. ................... 210/750 |
| 5,977,212 A * | 11/1999 | Ebner et al. .................. 523/210 |
| 6,369,148 B2 * | 4/2002 | Chiang et al. ................ 524/417 |
| 6,387,461 B1 * | 5/2002 | Ebner et al. ................. 428/35.7 |
| 6,586,514 B2 | 7/2003 | Chiang et al. |
| 6,601,732 B1 | 8/2003 | Rooney et al. |
| 6,610,215 B1 | 8/2003 | Cai et al. |
| 6,616,997 B1 | 9/2003 | Lauer et al. |
| 6,656,383 B1 | 12/2003 | Zenner et al. |
| 6,709,724 B1 | 3/2004 | Teumac et al. |
| 2004/0178386 A1 * | 9/2004 | Tung et al. .............. 252/188.28 |

FOREIGN PATENT DOCUMENTS

| EP | 0 328 336 A1 | 8/1989 |
|---|---|---|
| EP | 0 328 337 B1 | 8/1989 |

* cited by examiner

*Primary Examiner*—Mark Eashoo
*Assistant Examiner*—Peter F Godenschwager
(74) *Attorney, Agent, or Firm*—Welsh & Katz, Ltd.

(57) ABSTRACT

A closure that is able to prevent oxygen from entering the container upon which the closure is attached. Preferably, the closure is comprised of one piece wholly molded of plastic, oxygen scavenging or anti-oxidant compounds, and catalysts homogenously mixed therein. More preferably, the closure is a composition of polypropylene or high-density polyethylene with an oxygen scavenger and catalyst intergrated within the polypropylene or high-density polyethylene.

12 Claims, No Drawings

CLOSURE WITH OXYGEN SCAVENGER

FIELD OF THE INVENTION

This invention relates to a closure and more specifically to a closure with anti-oxidant or oxygen scavenger properties.

BACKGROUND ART

Many different kinds of packaged products, such as food, beverages and pharmaceuticals, can be adversely impacted through exposure to oxygen. The presence of oxygen in a package can cause oxygen contamination of the product being stored therein. The reaction of oxygen with chemicals present in foods and beverages can impact their odor and flavor. The reaction of oxygen with pharmaceuticals can impact their efficacy.

Molecular oxygen ($O_2$) can react with a number of different compounds that are found in a number of foods and beverages. Molecular oxygen can be reduced by other molecules through the addition of electrons to form, e.g., a superoxide, a hydroxyl radical, or hydrogen peroxide. Each of these reduced forms of oxygen are very reactive and are thus likely to react with a number of products in the food and beverage industry. The reduced forms of oxygen are especially likely to react with the carbon-carbon double bonds found in almost all products with complex organic components. This reaction can cause the rapid degradation of the product. For example, the oxidated product may have an altered odor or flavor. Further, only a slight amount of oxygen is necessary to eventually cause adverse effects in food. While ambient air can have around 21% oxygen, it is desirable to have an oxygen concentration of approximately 50 parts per billion or less in the packaged environment. It is most desirable to create and maintain a packaged environment free of oxygen and its reduced forms.

In order to keep a product in a substantially oxygen-free environment, two conditions are preferable. First, the container may be filled and sealed in a manner that eliminates a substantial amount of oxygen from the interior of the container. Second, the container may maintain an environment free of oxygen.

Numerous methods have been employed to seal a container with little or no oxygen inside of it. One method is to remove oxygen from the package through the use of a vacuum or through inert gas sparging. This method is somewhat effective at removing a majority of the oxygen present in ambient air from the product during packaging. However, using this method to remove substantially all oxygen is often times commercially unfeasible because of cost or time restraints. Other methods for removing oxygen from a container have therefore been developed.

However, even when a container is initially sealed with substantially no oxygen in the container, oxygen may enter the container by, for example, migrating through the container or closure material, especially at the closure/container interface. This is especially a problem with many plastics which, in their natural state, are partially porous as to oxygen. To combat this problem, containers made of plastic have been comprised of multiple layers, including a layer that may be effective in preventing oxygen from entering the closed container, such as is seen in U.S. Pat. No. 6,601,732. However, manufacturing containers with multiple layers can be complex, time consuming, and expensive. It is therefore desirable to have a structure that has an oxygen scavenger incorporated therein, thus eliminating the need for multiple layers.

SUMMARY OF THE INVENTION

The invention described herein relates to a closure that is able to prevent oxygen from entering the container upon which the closure is attached. Preferably, the closure is comprised of one piece wholly molded of plastic, oxygen scavenging or anti-oxidant compounds with catalysts homogenously mixed therein. More preferably, the closure is a composition of polypropylene or high-density polyethylene with an oxygen scavenger and catalyst integrated within the polypropylene or high-density polyethylene. Most preferably, the closure is a composition consisting essentially of polypropylene or high-density polyethylene with the oxygen scavenger sodium sulfite and a weakly acidic catalyst dispersed substantially evenly throughout.

While the present invention is susceptible of embodiments in various forms, there will hereinafter be described some exemplary and non-limiting embodiments, with the understanding that the present disclosure is to be considered an exemplification of the invention and is not intended to limit the invention to the specific embodiments illustrated.

DETAILED DESCRIPTION OF THE INVENTION

The invention is a closure comprised of a composition that is capable of preventing oxygen from entering a container once the closure is attached thereto. Preferably, the closure is a rigid, unitary structure that does not require additional, separate layers in order to block oxygen.

In the food and beverage industry, because of their ease of use and low cost, it is often desirable to use plastic closures or caps to close a container. However, typical plastic closures allow oxygen to migrate through them and enter the closed container. Additionally, oxygen leakage can occur at the interface between the closure and the container. This oxygen can then react with the food or beverage and result in a product of lesser quality. To resolve this problem, some have added additional layers of material called liners into the cap top to prevent the oxygen from passing into the closed container. However, these additional layers can add substantial cost.

The current invention relates to a closure having a top and depending sidewalls. Preferably, the inner portion of the side walls has threads or other features which allow it to connect with and close off the container. The closure may have a flange or other suitable feature that is disposed on the closure such that it interfaces with a rim of the container to close off the container more resolutely. The top and side walls can have a thickness that is between 0.020 and 0.075 inches. Most preferably, the thickness of the top is between 0.040 and 0.060 inches while the thickness of the sidewalls is between 0.040 and 0.060 inches. The closure preferably is made out of polypropylene ("PP") or high-density polyethylene ("HDPE") which is combined with an oxygen scavenger that is capable of reacting with oxygen and deactivating it by conversion to an inactive form of oxygen. More preferably, the closure further contains a catalyst that increases the reaction rate of the oxygen scavenger with oxygen.

The production of closures made of only PP and HDPE are well known in the art. Relevant to the current invention are the high temperatures that are associated with production of such closures. In a typical closure extrusion, temperatures between 325 and 500 degrees Fahrenheit can be utilized. Therefore, for the current invention, it is necessary to use an oxygen scavenger that is thermally stable up to that temperature. Scavengers could include ascorbates or isoascorbates, ascorbic acid, sodium sulfite, polyalkylamines, or ferrous oxide. In a preferred embodiment, the closure is composed of PP (or HDPE) and an effective amount of sodium sulfite (Na$_2$SO$_3$). The sodium sulfite reacts with oxygen to form sodium sulfate. When manufactured, a substantially anhydrous composition of sodium sulfite is preferably employed. Further, it is preferable to maintain the closure in a dry environment prior to placing it on the closure. Most preferably, the sodium sulfite is relatively uniformly disbursed throughout the closure so that all portions of the closure are effective barriers to ambient oxygen.

It may be desirable to increase the reaction rate of an oxygen scavenger with oxygen that occurs in a typical packaging or storage environment. To effect such an increase, the present invention provides for the use of one or more catalysts for that reaction. As mentioned earlier, the closure may be subjected to substantial temperatures. Therefore, the catalyst, like the oxygen scavenger, must be stable up to a temperature of 500 degrees Fahrenheit. Further, it is preferable to have the catalyst evenly distributed throughout the closure in an effective amount. The catalyst can be a transition metal that can be supplied from a salt or an amine. Examples include iron and copper salts. Most preferably, the catalyst is slightly acidic. In one embodiment, two or more co-catalysts may be employed. In one embodiment, the acidifying component can be calcined sodium acid pyrophosphate, which is added in an amount to obtain a desired pH.

The invention disclosed herein thus allows for a PP or HDPE closure with an oxygen scavenger and at least one catalyst integral with the closure. The closure is thus an integral composition that can act as an oxygen scavenger in and of itself, without the need for additional layers to provide that functionality. Preferably, the closure is a homogeneous composition with effective amounts of the oxygen scavenger and catalyst disbursed relatively uniformly throughout the closure. The ratio of oxygen scavenger/catalyst/PP or HDPE, expressed in weight, is preferably about 1-140 parts scavenger and about 0.01 to 5 parts catalyst to about 100 parts polymer. More preferably, the closure is composed of about 5-70 parts scavenger and about 0.5 to 3 parts catalyst to about 100 parts polymer. Most preferably, the closure is composed of about 20-40 parts scavenger and about 1-2 parts catalyst to about 100 parts polymer.

To construct the closure of the invention described herein, it is preferable to use a powdered form of the oxygen scavenger and catalyst. Particle sizes of 100 mesh or smaller are preferred. More preferably, the oxygen scavenger and catalyst are processed into pellets for addition into the machinery used to injection mold the closure. Most preferably, the oxygen scavenger and catalyst are processed into individual pellets which are combined with the PP or HDPE just before the injection molding process. This helps to preserve the capability of the oxygen scavenger to react with oxygen once it is integrated into the closure. Such a composition can be purchased from Alpha-Gary Corporation of Leicestershire, England under the tradename Alpha Seal, AGPPOXMB, which is an acronym for Alpha Gary PolyPropylene OXygen scavenger Master Batch.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A closure for a container comprising:
one piece of wholly molded of plastic in the shape of a closure being attachable to a suitable container, the closure being composed of polypropylene or high-density polyethylene, an oxygen scavenger comprising anhydrous sodium sulfite, and a catalyst comprising calcined sodium acid pyrophosphate, wherein the closure comprises a top and depending sidewalls, wherein the ratio of scavenger to catalyst to polypropylene or high-density polyethylene is about 5-70 parts scavenger to about 0.5 to 3 parts catalyst to about 100 parts polypropylene or high-density polyethylene.

2. The closure of claim 1, wherein the oxygen scavenger is stable up to the processing temperatures of polypropylene and high-density polyethylene.

3. The closure of claim 2, wherein the ratio of scavenger to catalyst to polypropylene or high-density polyethylene is about 20-40 parts scavenger to about 1-2 parts catalyst to about 100 parts polypropylene or high-density polyethylene.

4. The closure of claim 1, wherein the oxygen scavenger and catalyst are dispersed relatively uniformly throughout the closure.

5. The closure of claim 1, wherein the closure has a flange area configured to more securely attach the closure to the container, wherein the concentration of the oxygen scavenger is greater in the flange area than in other portions of the closure.

6. The closure of claim 1, further comprising a co-catalyst.

7. The closure of claim 6, wherein the co-catalyst is chosen from the group consisting of salts of transition metals, amines of transition metals, or calcined sodium acid pyrophosphate.

8. The closure of claim 1, wherein the top has a thickness of between 0.020 and 0.075 inches and the sidewalls have a thickness between 0.040 and 0.060 inches.

9. A method for making a rigid, unitary closure comprising:
providing a polymeric resin of polypropylene or high density polyethylene;
providing an oxygen scavenger comprising anhydrous sodium sulfite
providing an acidic catalyst capable of increasing the reaction rate of the oxygen scavenger with oxygen;
combining the resin, oxygen scavenger and acidic catalyst to form a composite wherein the ratio of scavenger to catalyst to polypropylene or high-density polyethylene is about 5-70 parts scavenger to about 0.5 to 3 parts catalyst to about 100 parts polypropylene or high-density polyethylene;
injection molding the composite into a unitary, rigid closure.

10. The method of claim 9 wherein the step of providing an oxygen scavenger comprises providing the oxygen scavenger as a powder of particles sizes of about 100 mesh or smaller.

11. The method of claim 10 wherein the oxygen scavenger and acidic catalyst are combined slightly before injection molding.

12. The method of claim 9, wherein the step of combining forms a substantially homogenous composite.

* * * * *